US011354270B2

(12) United States Patent
Ayyalasomayajula et al.

(10) Patent No.: US 11,354,270 B2
(45) Date of Patent: Jun. 7, 2022

(54) SEARCHING FOR A HASH STRING STORED IN AN INDEXED ARRAY

(71) Applicant: Microsoft Technology Licensing, LLC, Redmond, WA (US)

(72) Inventors: Prasad Durga Ayyalasomayajula, Redmond, WA (US); Ashish Munjal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 16/812,997

(22) Filed: Mar. 9, 2020

(65) Prior Publication Data

US 2021/0279206 A1    Sep. 9, 2021

(51) Int. Cl.
| G06F 16/13 | (2019.01) |
| G06F 16/22 | (2019.01) |
| G06F 16/14 | (2019.01) |
| H04L 9/08 | (2006.01) |

(52) U.S. Cl.
CPC .......... *G06F 16/137* (2019.01); *G06F 16/152* (2019.01); *G06F 16/2255* (2019.01); *H04L 9/0819* (2013.01)

(58) Field of Classification Search
CPC ........... G06F 17/30023; G06F 17/3033; G06F 17/30424; G06F 17/30799
See application file for complete search history.

(56) References Cited

U.S. PATENT DOCUMENTS

| 6,292,795 | B1 | 9/2001 | Peters et al. |
| 6,751,628 | B2 | 6/2004 | Coady |
| 10,884,982 | B2 * | 1/2021 | Oliveri ................. G06F 16/152 |
| 2008/0319987 | A1 | 12/2008 | Takuma et al. |
| 2009/0216868 | A1 | 8/2009 | Gao et al. |
| 2011/0239299 | A1 | 9/2011 | Chen et al. |
| 2017/0011120 | A1 * | 1/2017 | Cheung ............. G06F 16/90344 |
| 2018/0336263 | A1 | 11/2018 | Bensberg et al. |

(Continued)

FOREIGN PATENT DOCUMENTS

JP    2006099524 A    4/2006

OTHER PUBLICATIONS

"International Search Report and the Written Opinion Issued in PCT Application No. PCT/US21/015984", dated May 20, 2021, 11 Pages.

(Continued)

*Primary Examiner* — Angelica Ruiz
(74) *Attorney, Agent, or Firm* — Holzer Patel Drennan (57) ABSTRACT

Systems and methods for searching for hash strings stored in an indexed array are described. A method includes receiving a hash string. The method includes determining a first set of index values for the indexed array that correspond to a first stored value matching a first portion of the hash string and determining a second set of index values for the indexed array that correspond to a second stored value matching a second portion of the hash string if a match between the first stored value and the first portion of the hash string is found. The method includes upon finding a match for the first stored value and the second stored value, comparing the hash string to each of the set of hash strings in the indexed array having an index value common to both the first set of index values and the second set of index values.

20 Claims, 7 Drawing Sheets

(56) References Cited

U.S. PATENT DOCUMENTS

2019/0065494 A1* 2/2019 Abali ............... G06F 16/90344
2019/0114324 A1    4/2019 Conway et al.

OTHER PUBLICATIONS

Analyti, et al., "Fast Search in Main Memory Databases", In Proceedings of the ACM SIGMOD International Conference on Management of Data, Jun. 1, 1992, pp. 215-219.

Xia, et al., "Indexing Continuously Changing Data with Mean-Variance Tree", In Proceedings of the ACM symposium on Applied Computing, Mar. 13, 2005, pp. 1125-1132.

* cited by examiner

SEARCHING FOR A HASH STRING STORED IN AN INDEXED ARRAY

BACKGROUND

Computing systems can be used to process data, code, or other types of information; they can also be used to search stored information. Such stored information may include data, code, or other types of information converted into hash strings. Hash strings may be generated by applying a hash function to any form of data, code, or other types of information. The hash strings may be stored in one or more databases. Hash strings corresponding to data values or other information that does not change over a short period of time are easier to search. However, hash strings corresponding to data values or other information that is constantly changing are harder to search.

SUMMARY

In one example, the present disclosure relates to a method, implemented by a processor, for searching an indexed array including a set of hash strings. The method may include receiving a hash string. The method may further include using the processor, determining a first set of index values for the indexed array that correspond to a first stored value matching a first portion of the hash string and determining a second set of index values for the indexed array that correspond to a second stored value matching a second portion of the hash string if a match between the first stored value and the first portion of the hash string is found. The method may further include using the processor, upon finding a match between both the first stored value and the first portion of the hash string and a match between the second stored value and the second portion of the hash string, comparing the hash string to each of the set of hash strings in the indexed array having an index value common to both the first set of index values and the second set of index values.

In another example, the present disclosure relates to a method, implemented by a processor, for searching an indexed array including a set of hash strings. The method may include receiving a hash string comprising X number of bits, where X is an integer greater than one. The method may further include using the processor, extracting a first set of bits from the X number of bits, a second set of bits from the X number of bits, and a third set of bits from the X number of bits. The method may further include using the processor, looking up a symbol table to determine a first set of index values for the indexed array that correspond to a first stored value matching the first set of bits, looking up the symbol table to determine a second set of index values for the indexed array that correspond to a second stored value matching the second set of bits if a match between the first stored value and the first set of bits is found, and looking up the symbol table to determine a third set of index values for the indexed array that correspond to a third stored value matching the third set of bits if a match between the second stored value and the second set of bits is found. The method may further include using the processor, upon finding a match between the first stored value and the first set of bits, a match between the second stored value and the second set of bits, and a match between the third stored value and the third set of bits, comparing the hash string to each of the set of hash strings in the indexed array having an index value common to the first set of index values, the second set of index values, and the third set of index values to determine a match between the hash string and any of the set of hash strings stored in the indexed array.

In yet another example, the present disclosure relates to a system, including a processor, for searching an indexed array, stored in a memory, including a set of hash strings. The system may be configured to receive a hash string. The system may further be configured to determine a first set of index values for the indexed array that correspond to a first stored value matching a first portion of the hash string and determine a second set of index values for the indexed array that correspond to a second stored value matching a second portion of the hash string if a match between the first stored value and the first portion of the hash string is found. The system may further be configured to upon finding a match between both the first stored value and the first portion of the hash string and a match between the second stored value and the second portion of the hash string, compare the hash string to each of the set of hash strings in the indexed array having an index value common to both the first set of index values and the second set of index values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to searching for hash strings stored in at least one indexed array. Information, including data, code, or other types of information, may be converted into hash strings. As an example, hash strings may be generated by applying a hash function to any form of data, code, or other types of information. Hash strings may be stored in one or more databases. Data, code, or other types of information that is being processed may also be stored in database(s) or other types of data structures, including a Merkel tree. Certain examples further relate to searching hash strings corresponding to data values or other information that is constantly changing. Examples of hash strings that may be derived from changing data values include hash strings used with blockchains. As an example, hash strings stored as part of a Merkel tree associated with a blockchain may be the source of hash strings. Hash strings may also correspond to data stored in routing tables associated with a large network of devices. Hash strings may also be obtained from any other source.

Figure 1:
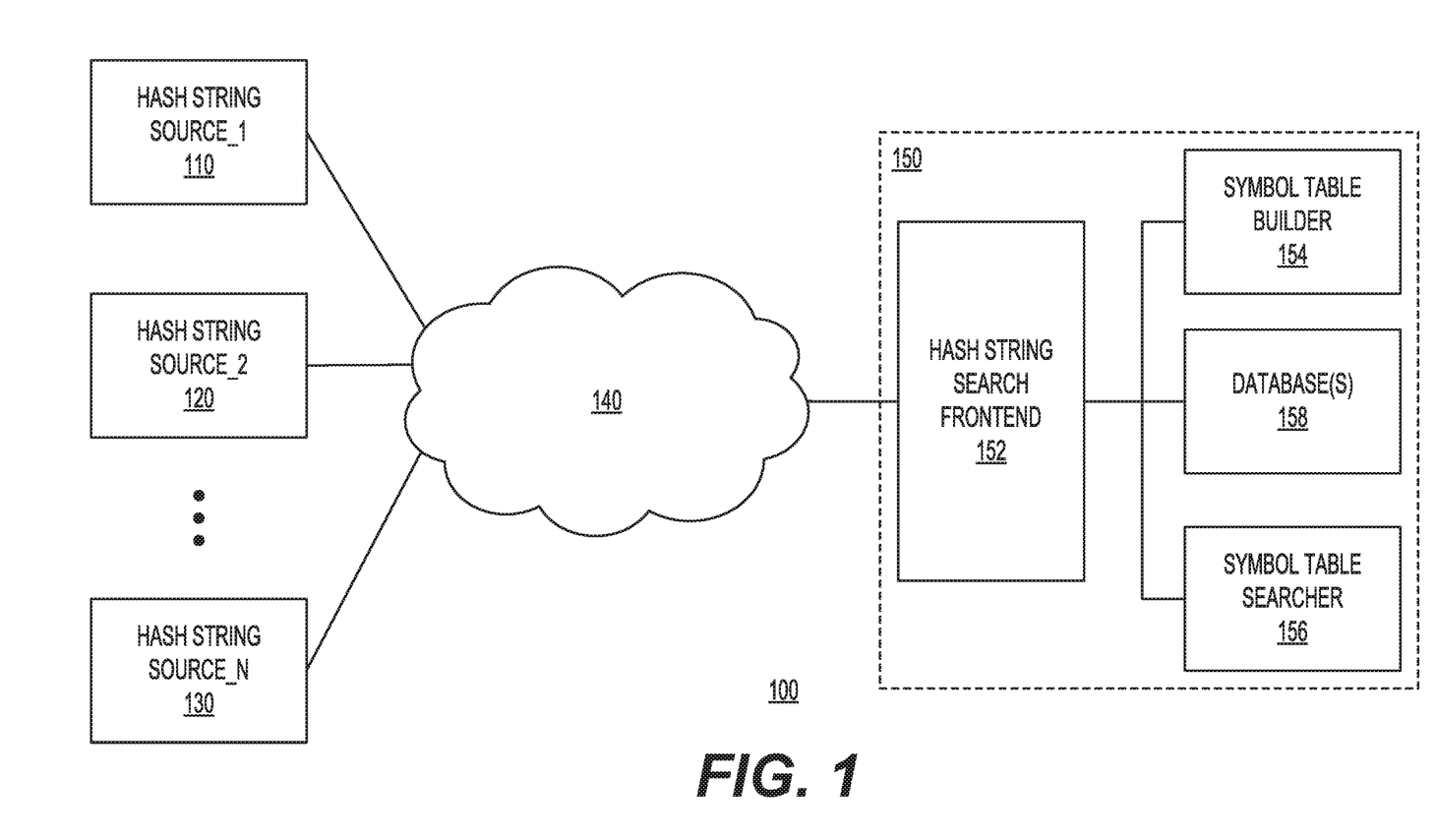
FIG. 1 is a block diagram of a system environment for the searching of hash strings in accordance with one example.

FIG. 1 is a block diagram of a system environment 100 for the searching of hash strings in accordance with one example. System environment 100 may include a system 150 for searching hash strings. System environment 100 may include any number of hash string source(s) (e.g., hash string source_1 110, hash string source_2 120, and hash string source_N 130) coupled to a system 150. In this example, the hash string source(s) may be coupled via network 140 to system 150. Network 140 may correspond to any kind of wireless or wired networks. Thus, network 140 may include components such as routers, gateways, communication links (wired or wireless), and other components needed to transmit/receive information among network endpoints.

With continued reference to FIG. 1, system 150 may include a hash string search frontend 152, a symbol table builder 154, a symbol table searcher 156, and one or more databases 158. Hash string search frontend 152 may be configured to obtain hash strings from one or more sources of hash strings. Hash string search frontend 152 may be implemented by instructions configured to execute using one or more processors. Hash string search frontend 152 may also be configured to provide an application programming interface (API) such that any number of other applications may initiate search inquiries or build search databases, including hash string arrays. Hash string search frontend 152 may also implement a graphical user interface allowing users to initiate search inquiries and provide results.

Still referring to FIG. 1, symbol table builder 154 may be configured to receive any hash strings from hash string search frontend 152 and process them. In one example, as explained in detail with respect to FIG. 3 and FIG. 4, symbol table builder 154 may perform an insert method that may be used to build one or more symbol tables. In this example, any such symbol tables may be stored in one or more database(s) 158. Database(s) 158 may be implemented using any persistent storage and software that allows access to tables or other types of storage formats. Symbol table searcher 156 may be implemented to perform search operations. In one example, as explained in detail with respect to FIG. 3 and FIG. 5, symbol table searcher 156 may be used to search for a hash string. Although FIG. 1 shows system environment 100 and system 150 as including a certain number of components arranged and coupled in a certain way, each of these may include fewer or additional components arranged and coupled differently. As an example, a hash string source may include a database that is part of system 150 and thereby obviate the need for a network coupling. In addition, the functionality associated with system 150 may be distributed or combined, as needed.

Figure 2:
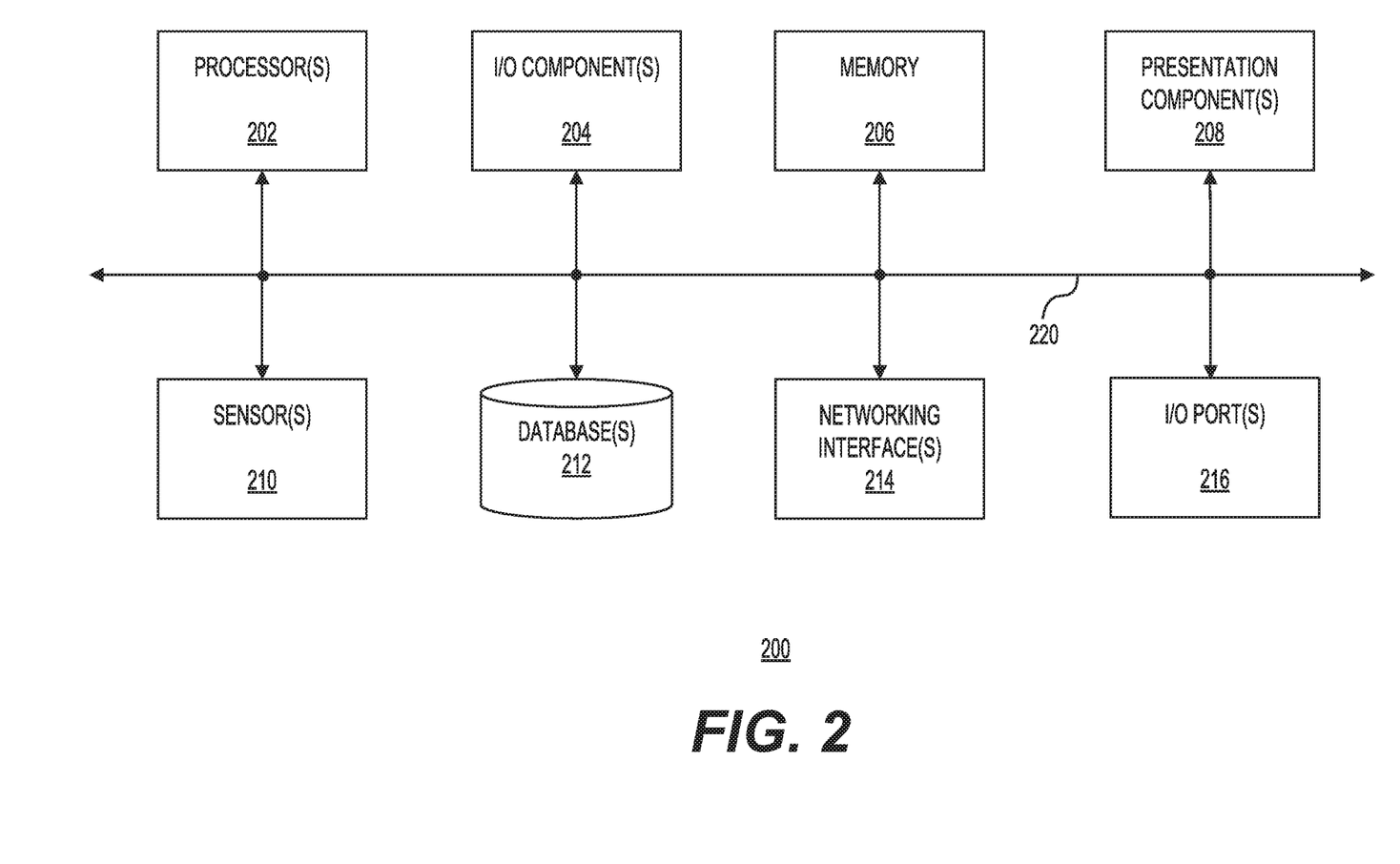
FIG. 2 is a block diagram of a system for performing methods associated with the present disclosure in accordance with one example.

FIG. 2 is a block diagram of a system 200 for performing methods associated with the present disclosure in accordance with one example. System 200 may include a processor(s) 202, I/O component(s) 204, memory 206, presentation component(s) 208, sensors 210, database(s) 212, networking interfaces 214, and I/O port(s) 216, which may be interconnected via bus 220. Processor(s) 202 may execute instructions stored in memory 206. I/O component(s) 204 may include components such as a keyboard, a mouse, a voice recognition processor, or touch screens. Memory 206 may be any combination of non-volatile storage or volatile storage (e.g., flash memory, DRAM, SRAM, or other types of memories). Instructions corresponding to the methods associated with hash strings may be stored in memory 206 or another memory. These instructions when executed by processor(s) 202, or other processors, may provide the functionality associated with these methods. Presentation component(s) 208 may include displays, holographic devices, or other presentation devices. Displays may be any type of display, such as LCD, LED, or other types of display. Sensor(s) 210 may include telemetry or other types of sensors configured to detect, and/or receive, information (e.g., hash strings).

Still referring to FIG. 2, database(s) 212 may be used to store hash strings, symbol tables, and other data structures, as needed for the performance of methods described herein. In this example, database(s) 212 may correspond to database(s) 158 of FIG. 1. Database(s) 212 may be implemented as a collection of distributed databases or as a single database. Network interface(s) 214 may include communication interfaces, such as Ethernet, cellular radio, Bluetooth radio, UWB radio, or other types of wireless or wired communication interfaces. I/O port(s) 216 may include Ethernet ports, Fiber-optic ports, wireless ports, or other communication ports. Although FIG. 2 shows system 200 as including a certain number of components arranged and coupled in a certain way, it may include fewer or additional components arranged and coupled differently. In addition, the functionality associated with system 200 may be distributed, as needed.

Figure 3:
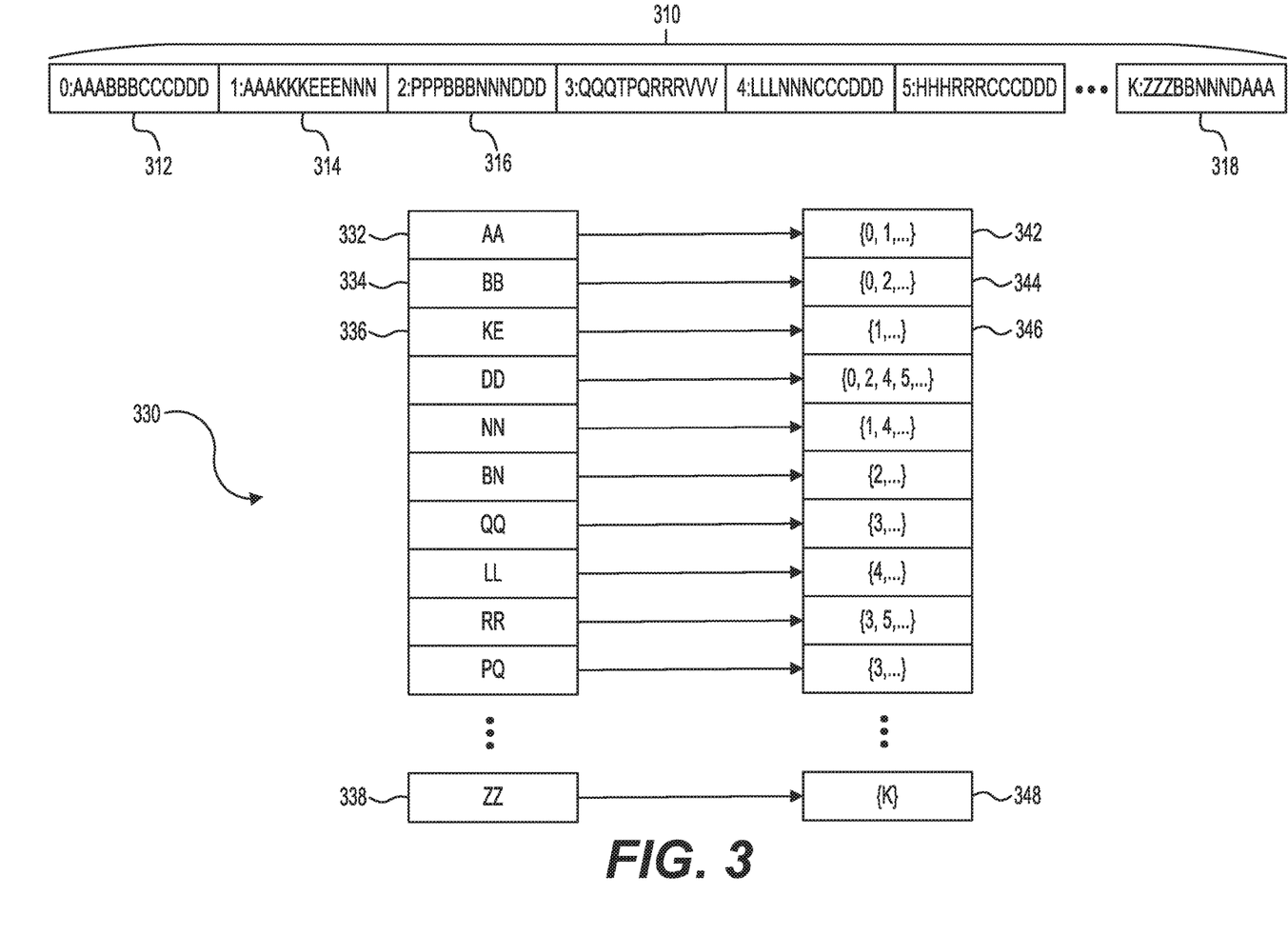
FIG. 3 shows an example of an indexed array for storing hash strings and a symbol table in accordance with one example.

FIG. 3 shows an example of an indexed array 310 for storing hash strings and a symbol table 330 in accordance with one example. Indexed array 310 may be used to store hash strings that require searching. In one example, regardless of how the hash strings were stored in the first instance, they are stored as an indexed array for the purpose of performing a search of the hash strings. As explained earlier, hash strings may be received from one or more sources. In one example, hash strings may correspond to the encrypted hash values from a Merkel tree corresponding to a blockchain. In another example, hash strings may correspond to values from a routing table for a network or a set of networks. In this example, indexed array 310 is organized as a single row of hash strings. Alternatively, indexed array 310 may be organized as a single column of hash strings. As shown in FIG. 3, indexed array 310 may include any number of hash strings, including for example, K hash strings, where K is an integer value corresponding to the number of hash strings stored in indexed array 300. In this example, indexed array 310 may include hash string 312, hash string 314, hash string 316, and hash string 318. Hash string 312 (AAABBBCCCDDD) is stored at index value 0 in indexed array 310. Hash string 314 (AAAKKKEEENNN) is stored at index value 1 in indexed array 310. Hash string 316 (PPPBBBNNNDDD) is stored at index value 2 in indexed array 310. Hash string 318 (ZZZBBNNNDAAA) is stored at index value K (K being an integer greater than one) in indexed array 310.

With continued reference to FIG. 3, in one example, each of these hash strings may be encrypted hashes generated by applying a hash function to any data, code, or other types of information. As an example, each of the hash strings may be generated by applying the Secure Hash Algorithm 1 (SHA-1) cryptographic hash function to an input. In this case, each of the hash strings may comprise 160 bits. In another example, each of the hash strings may be generated by applying any of the Secure Hash Algorithm 2 (SHA-2) cryptographic hash functions to an input. Thus, any of the cryptographic functions SHA-224, SHA-256, SHA-384, of SHA-512 may be applied to the input. In this case, each of the hash strings may comprise 224 bits, 256 bits, 384 bits, or 512 bits.

Still referring to FIG. 3, symbol table 330 may be built by executing instructions corresponding to symbol table builder 154 of FIG. 1. Symbol table 330 may be created as the hash strings are received by hash string frontend 150 from any of the hash string sources. As an example, assuming hash string 312 is the first hash string stored as part of indexed array 310 at index value 0, symbol table builder 154 may extract a first portion (e.g., left most 10 bits) of hash string 312 and create a first entry for symbol table 330. Assuming the hash string has 160 bits, the left most 10 bits may correspond to the bits located at bit positions 0, 1, 2, 3, 4, 5, 6, 7, 8, and 9. In this example, symbol table entry 332 may include the extracted first portion 332 (e.g., AA) of hash string 312 (AAABBBCCCDDD) and an index value 342 (0). Symbol table builder 154 may also extract a second portion (e.g., middle 10 bits) of hash string 312 and create a second entry for symbol table 330. Assuming the hash string has 160 bits, the middle 10 bits may correspond to the bits located at bit positions 76, 77, 78, 79, 80, 81, 82, 83, 84, and 85. As a result, symbol table 330 may include a second entry comprising the extracted second portion 334 (e.g., BB) of hash string 312 (AAABBBCCCDDD) and an index value 344 (0). The bit portion that is extracted may also correspond to right most 10 bits of hash string 312. Assuming the hash string has 160 bits, the right most 10 bits may correspond to the bits located at bit positions 150, 151, 152, 153, 154, 155, 156, 157, 158, and 159.

With continued reference to FIG. 3, symbol table builder 154 may process multiple hash strings in parallel and continue to build symbol table 330 as more hash strings are received. As an example, when the next hash string (e.g., hash string 314) is received, symbol table builder 154 may extract a hash string portion (e.g., KE) of hash string 314 (AAAKKKEEENNN) and create another symbol table entry. Symbol table entry may include the extracted second portion 336 (e.g., KE) of hash string 312 (AAABBBCCCDDD) and an index value 346 (0). Additional symbol table entries may be created as more hash strings are received or processed. As an example, a symbol table entry may include an extracted portion 338 (e.g., ZZ) and an index value 348 (e.g., K). As shown in FIG. 3, the extracted portions of hash strings may be found in hash strings corresponding to more than one index values. Thus, as shown in FIG. 3, portion 332 (e.g., AA) may be found in hash strings stored as part of indexed array 310 at index values 0 and 1. In one example, extracted hash string portions may be referred to as keys. Symbol table 330 may include a set of key value pairs of linked data items (the extracted portions or keys and the index values).

Still referring to FIG. 3, each of indexed array 310 and symbol table 330 have the same number of entries. As explained earlier, the keys used during the search may be a selected number of bits from the bits corresponding to the hash string. In this manner, the indexed array and the symbol table have the same number of entries and the set of bits become a direct index to the indexed array. In contrast, if the index were an indirect index (e.g., index values may be another set of values), then the search process may take longer to perform. In sum, advantageously, the direct index allows a jump directly to the entry in the symbol table that has the key (e.g., the left most 10 bits of a hash string). Although FIG. 3 shows indexed array 310 as one indexed array, the hash strings may be stored in multiple indexed arrays that may have consecutive index values. In addition, although FIG. 3 shows symbol table 330 as a single table, symbol table 330 may comprise multiple tables that might be connected via pointers or other data structures.

Figure 4:
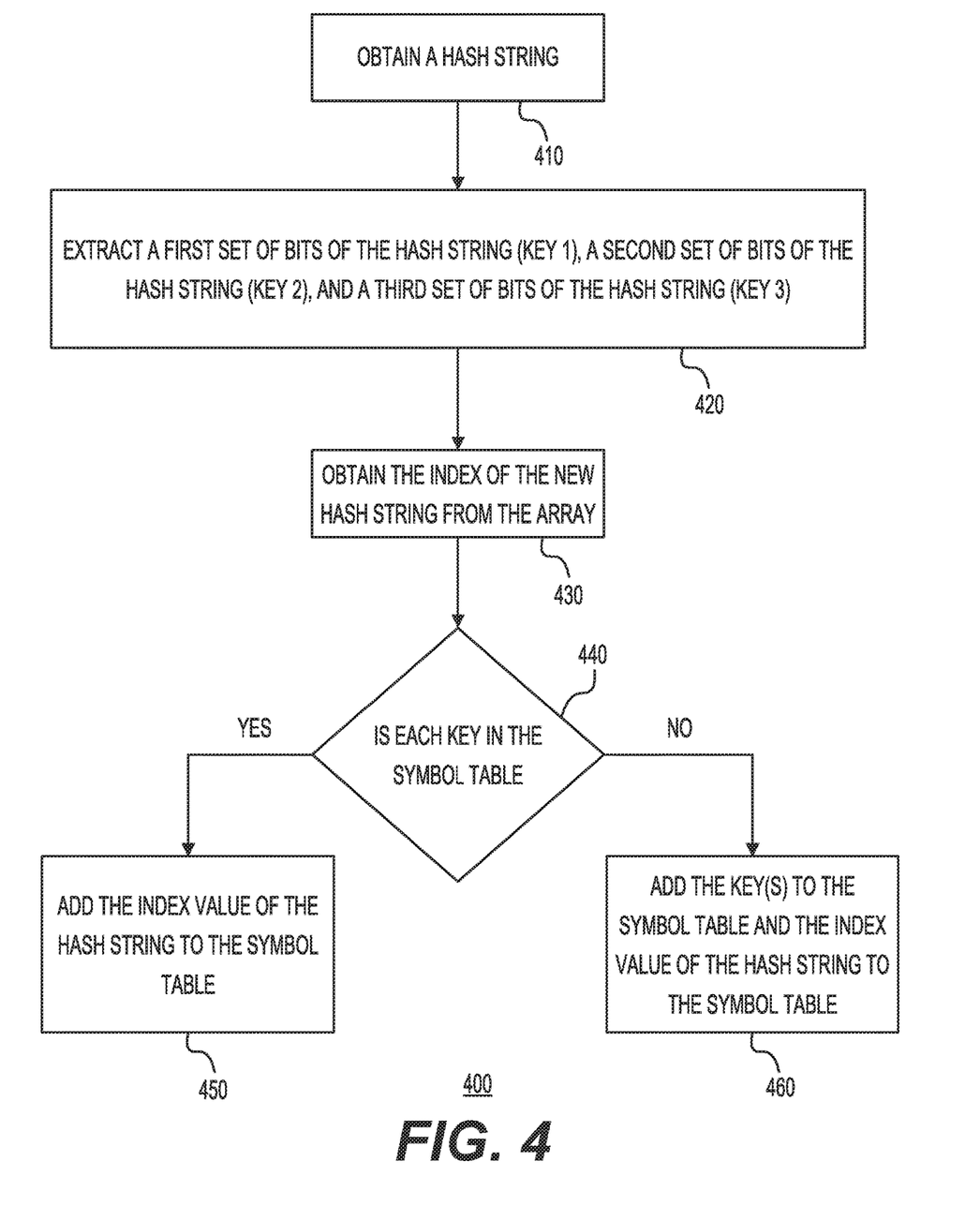
FIG. 4 shows a flow chart of a method, implemented by a processor, for processing hash strings in accordance with one example.

FIG. 4 shows a flow chart 400 of a method, implemented by a processor, for processing hash strings in accordance with one example. Flow chart 400 corresponds to an insert operation that may be performed by symbol table builder 154. As an example, when instructions corresponding to symbol table builder 154 are executed by a processor (e.g., processor(s) 202 of FIG. 2), steps 410, 420, 430, 440, and 450 or 460 may be performed. Step 410 may include obtaining a hash string. As part of this step, symbol table builder 154 may obtain a hash string from hash string search frontend 152. Step 420 may include extracting a first set of bits (e.g., 10 leftmost bits (KEY 1)) of the hash string, a second set of bits (e.g., middle 10 bits (KEY 2)) of the hash string (KEY 2), and a third set of bits (e.g., rightmost 10 bits (KEY 3)) of the hash string. Although this example relates to 10 bits that are selected from certain example bit locations corresponding to the hash string, other examples of bit lengths and bit positions may also be used. In addition, each key need not be the same number of bits, instead keys of variable length may be used. In this example, instructions corresponding to symbol table builder 154, when executed by a processor (e.g., processor(s) 202 of FIG. 2), may perform this step.

With continued reference to FIG. 4, step 430 may include obtaining the index of the new hash string from the array. In this example, instructions corresponding to symbol table builder 154, when executed by a processor (e.g., processor(s) 202 of FIG. 2), may perform this step. As an example, with reference to FIG. 3, when hash string 318 is processed, index value K for hash string 318 may be obtained. Step 440 may include determining whether each key (e.g., KEY 1, KEY 2, and KEY 3) is in the symbol table. In this example, instructions corresponding to symbol table builder 154, when executed by a processor (e.g., processor(s) 202 of FIG. 2), may perform this step. As an example, referring to FIG. 3, symbol table builder 154 when processing hash string 318 may determine that KEY 1 (e.g., ZZ) is not in symbol table 330 when hash string 318 is processed for the first time. However, with respect to KEY 2 (e.g., NN), symbol table builder 154 may determine that this key is already in symbol table 330.

Still referring to FIG. 4, if in step 440 each key is found in the symbol table (e.g., symbol table 330), symbol table builder 154 may perform step 450. As part of this step, symbol table builder 154 may add the index value of the hash string to the symbol table. In this example, instructions corresponding to symbol table builder 154, when executed by a processor (e.g., processor(s) 202 of FIG. 2), may perform this step. Alternatively, if in step 440 each key is not found in the symbol table (e.g., symbol table 330), symbol table builder 154 may perform step 460. As part of step 460, symbol table builder 154 may add the key(s) (e.g., key ZZ corresponding to hash string 318) to the symbol table (e.g., symbol table 330) and symbol table builder 154 may also add the index value (e.g., K for hash string 318) to the symbol table (e.g., symbol table 330). In this example, instructions corresponding to symbol table builder 154, when executed by a processor (e.g., processor(s) 202 of FIG. 2), may perform this step. Although FIG. 4 shows a certain number of steps performed in a certain order, additional or fewer steps in a different order may be performed as part of flow chart 400.

Figure 5:
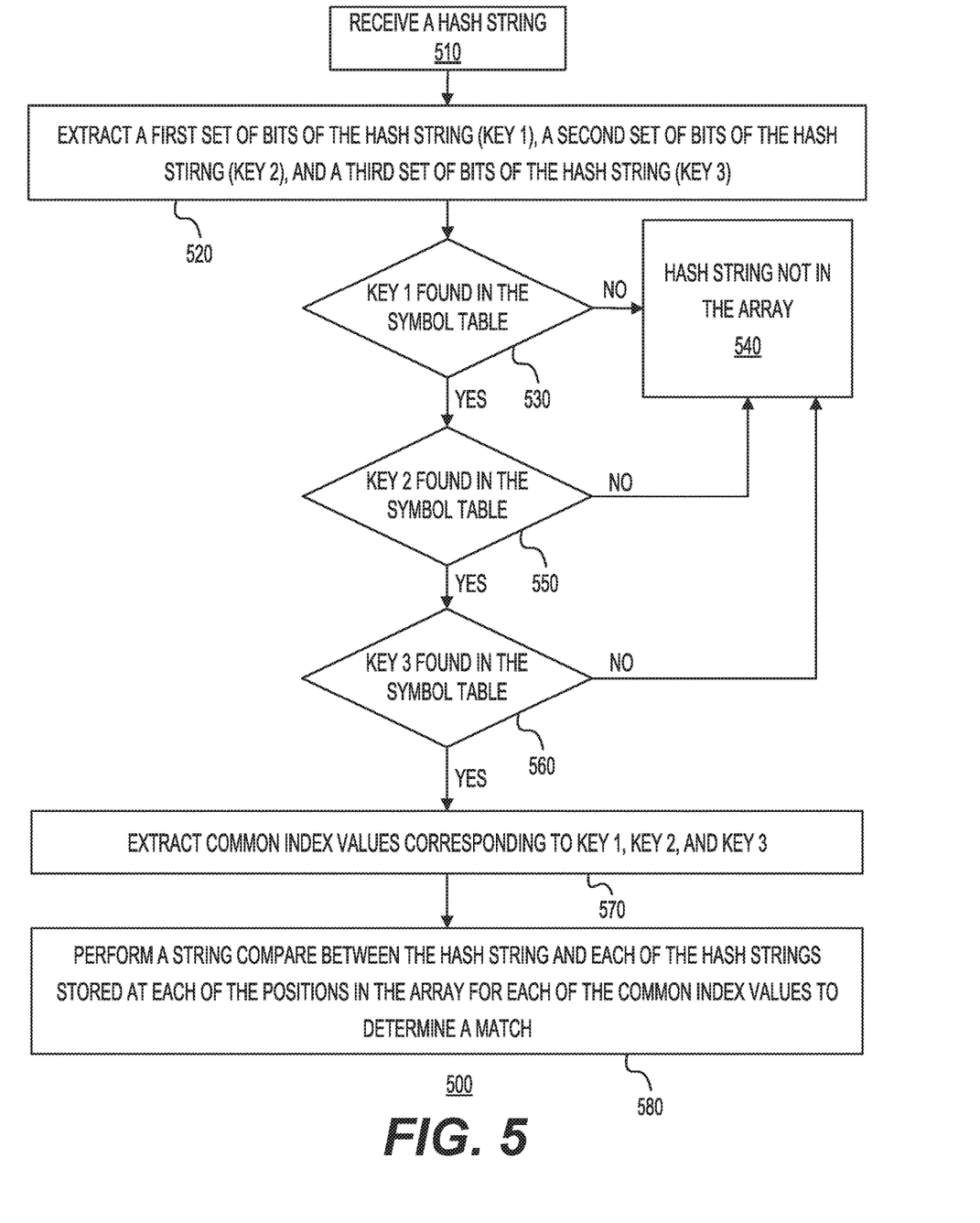
FIG. 5 shows a flow chart of a method, implemented by a processor, for searching hash strings stored in an indexed array in accordance with one example.

FIG. 5 shows a flow chart 500 of a method, implemented by a processor, for searching hash strings stored in an indexed array in accordance with one example. Flow chart 500 corresponds to a search operation that may be performed by symbol table searcher 156. As an example, when instructions corresponding to symbol table searcher 156 are executed by a processor (e.g., processor(s) 202 of FIG. 2), steps 510, 520, 530, 540, 550, 560, 570, and/or 580 may be performed. Step 510 may include receiving a hash string. As part of this step, symbol table searcher 156 may obtain a hash string from hash string search frontend 152 or database(s) 158. Step 520 may include extracting a first set of bits (e.g., 10 leftmost bits (KEY 1)) of the hash string, a second set of bits (e.g., middle 10 bits (KEY 2)) of the hash string, and a third set of bits (e.g., rightmost 10 bits (KEY 3)). In this example, instructions corresponding to symbol table searcher 156, when executed by a processor (e.g., processor(s) 202 of FIG. 2), may perform this step.

With continued reference to FIG. 5, in step 530, symbol table searcher 156 may determine whether KEY 1 is found in the symbol table (e.g., symbol table 330 of FIG. 3). If KEY 1 is not found in the symbol table, then symbol table searcher 156 concludes the search by performing step 540 and indicating that the hash string is not in the indexed array. If, however, KEY 1 is found in the symbol table, then the processing moves to step 550. In step 550, symbol table searcher 156 may determine whether KEY 2 is found in the symbol table (e.g., symbol table 330 of FIG. 3). If KEY 2 is not found in the symbol table, then symbol table searcher 156 concludes the search by performing step 540 and indicating that the hash string is not in the indexed array. If, however, KEY 2 is found in the symbol table, then the processing moves to step 560. In step 560, symbol table searcher 156 may determine whether KEY 3 is found in the symbol table (e.g., symbol table 330 of FIG. 3). If KEY 3 is not found in the symbol table, then symbol table searcher 156 concludes the search by performing step 540 and indicating that the hash string is not in the indexed array. If, however, KEY 3 is found in the symbol table, then the processing moves to step 570. In this example, instructions corresponding to symbol table searcher 156, when executed by a processor (e.g., processor(s) 202 of FIG. 2), may perform each of steps 530, 540, 550, and 560. Although this example requires determining a match for three keys, the hash string search may include searching for only two keys. Thus, after step 550, the search method may proceed to step 570.

Still referring to FIG. 5, in step 570, in this example, having found all three keys corresponding to the first set of bits of the hash string (KEY 1), the second set of bits of the hash string (KEY 2), and the third set of bits of the hash string (KEY 3), symbol table searcher 156 extracts common index values corresponding to KEY 1, KEY 2, and KEY 3. Referring to FIG. 3, assuming KEY 1 corresponds to AA, KEY 2 corresponds to KE, and KEY 3 corresponds to NN, then the common index value 1 is extracted from the symbol table (e.g., symbol table 330). In this example, instructions corresponding to symbol table searcher 156, when executed by a processor (e.g., processor(s) 202 of FIG. 2), may perform step 570.

With continued reference to FIG. 5, step 580 may include performing a string comparison between the hash string and each of the hash strings stored at each of the positions in the indexed array for each of the common index values to determine a match. Using the example with respect to step 570, the common index value is determined to be 1. As part of step, symbol table searcher 156 may compare the hash string with the hash string at index value 1 in the indexed array (e.g., indexed array 310). Thus, the hash string may be compared against the stored hash string: AAAKK-KEEENNN. If there is a match, then the search process ends by indicating that the received hash string was found, else the search process ends by indicating that the received hash string was not found in the indexed array. Although FIG. 5 shows a certain number of steps performed in a certain order, additional or fewer steps in a different order may be performed as part of flow chart 500.

Figure 6:
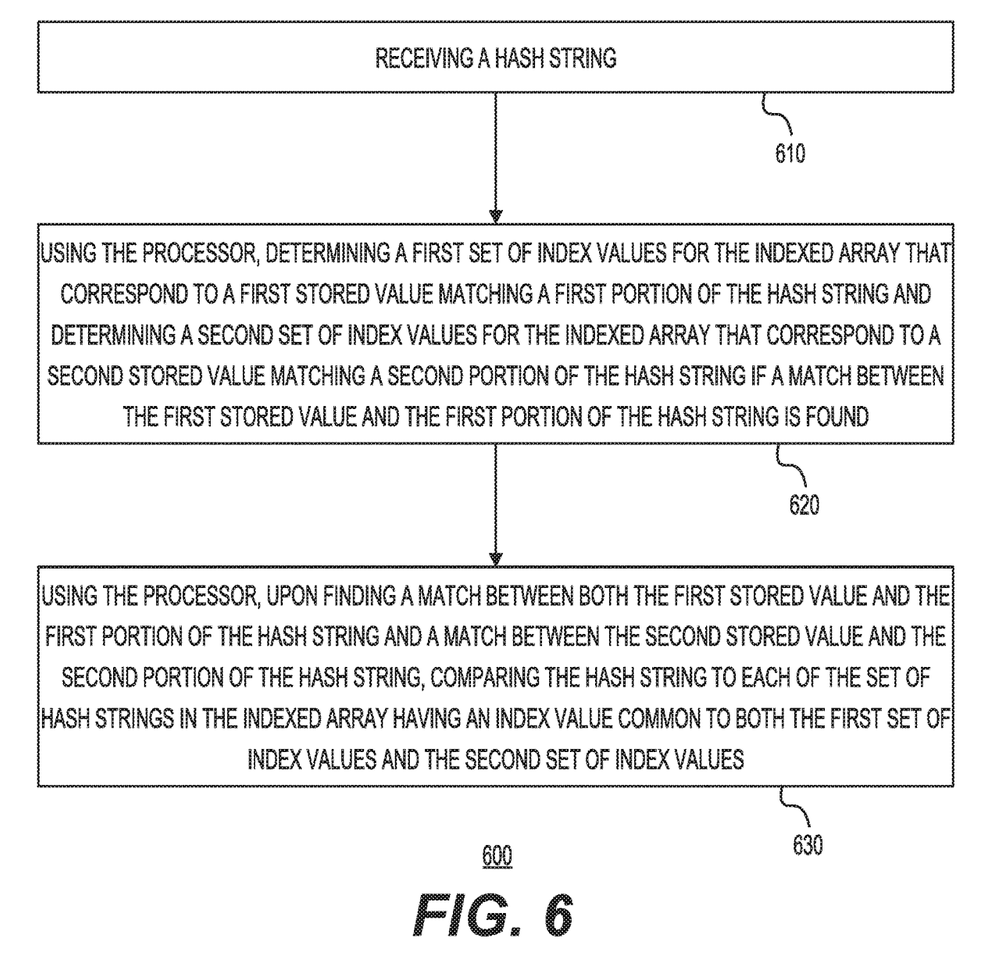
FIG. 6 shows a flow chart of another method, implemented by a processor, for searching hash strings stored in an indexed array in accordance with one example.

FIG. 6 shows a flow chart 600 of another method, implemented by a processor, for searching hash strings stored in an indexed array in accordance with one example. As an example, when instructions corresponding to symbol table searcher 156 are executed by a processor (e.g., processor(s) 202 of FIG. 2), steps 610, 620, and 630 may be performed, Step 610 may include receiving a hash string. As part of this step, symbol table searcher 156 may obtain a hash string from hash string search frontend 152 or database(s) 158.

With continued reference to FIG. 6, step 620 may include using a processor, determining a first set of index values for the indexed array that correspond to a first stored value matching a first portion of the hash string and determining a second set of index values for the indexed array that correspond to a second stored value matching a second portion of the hash string if a match between the first stored value and the first portion of the hash string is found. In this example, when instructions corresponding to symbol table searcher 156 are executed by a processor (e.g., processor(s) 202 of FIG. 2), this step may be performed. In one example, this step may include performing steps 520, 530, and 550 described earlier with respect to FIG. 5. Thus, the first stored value may correspond to KEY 1 and the second stored value may correspond to KEY 2. The extracted respective portions of the hash string may be compared with the stored values to determine a match.

Still referring to FIG. 6, step 630 may include using the processor, upon finding a match between both the first stored value and the first portion of the hash string and a match between the second stored value and the second portion of the hash string, comparing the hash string to each of the set of hash strings in the indexed array having an index value common to both the first set of index values and the second set of index values. In this example, when instructions corresponding to symbol table searcher 156 are executed by a processor (e.g., processor(s) 202 of FIG. 2), this step may be performed. In one example, this step may include performing step 580 described earlier with respect to FIG. 5. Although FIG. 6 shows certain number of steps performed in a certain order, additional or fewer steps in a different order may be performed as part of flow chart 600.

Figure 7:
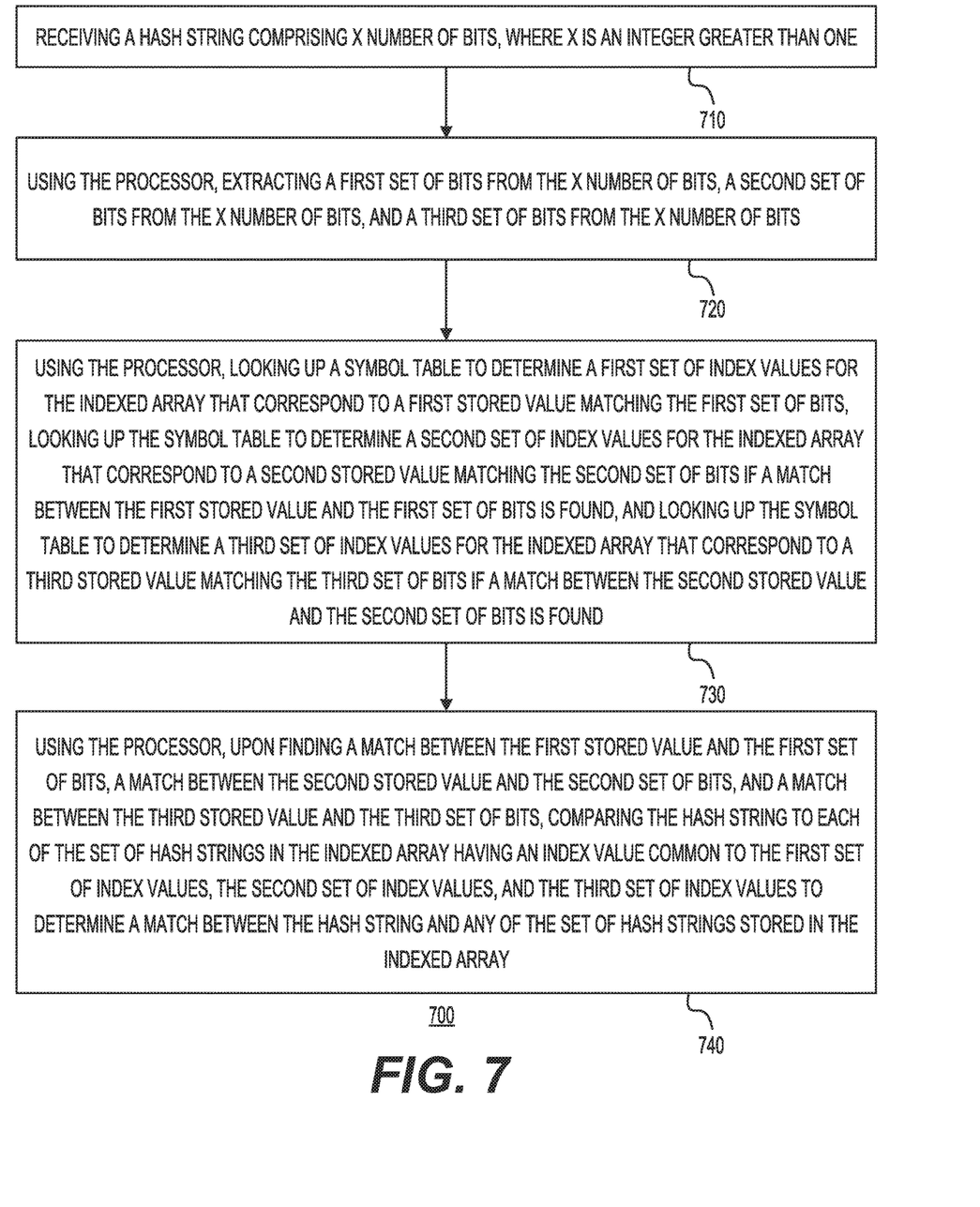
FIG. 7 shows another flow chart of a method, implemented by a processor, for searching hash strings stored in an indexed array in accordance with one example.

FIG. 7 shows another flow chart 700 of a method, implemented by a processor, for searching hash strings stored in an indexed array in accordance with one example. As an example, when instructions corresponding to symbol table searcher 156 are executed by a processor (e.g., processor(s) 202 of FIG. 2), steps 710, 720, and 730 may be performed. Step 710 may include receiving a hash string comprising X number of bits, where X is an integer greater than one. As part of this step, symbol table searcher 156 may obtain the hash string from hash string search frontend 152 or database(s) 158.

With continued reference to FIG. 7, step 720 may include using the processor, extracting a first set of bits from the X number of bits, a second set of bits from the X number of bits, and a third set of bits from the X number of bits. In this example, when instructions corresponding to symbol table searcher 156 are executed by a processor (e.g., processor(s) 202 of FIG. 2), this step may be performed. In one example, this step may include performing steps 520, 530, 550, and 560 described earlier with respect to FIG. 5. Thus, the first set of bits may correspond to KEY 1, the second set of bits may correspond to KEY 2, and the third set of bits may correspond to KEY 3. The extracted respective portions of the hash string may be compared with the stored values to determine a match Still referring to FIG. 7, step 730 may include using the processor, looking up a symbol table to determine a first set of index values for the indexed array that correspond to a first stored value matching the first set of bits, looking up the symbol table to determine a second set of index values for the indexed array that correspond to a second stored value matching the second set of bits if a match between the first stored value and the first set of bits is found, and, looking up the symbol table to determine a third set of index values for the indexed array that correspond to a third stored value matching the third set of bits if a match between the second stored value and the second set of bits is found. In this example, when instructions corresponding to symbol table searcher 156 are executed by a processor (e.g., processor(s) 202 of FIG. 2), this step may be performed. In one example, this step may include performing step 570 described earlier with respect to FIG. 5.

With continued reference to FIG. 7, step 740 may include using the processor, upon finding a match between the first stored value and the first set of bits, a match between the second stored value and the second set of bits, and a match between the third stored value and the third set of bits, comparing the hash string to each of the set of hash strings in the indexed array having an index value common to the first set of index values, the second set of index values, and the third set of index values to determine a match between the hash string and any of the set of hash strings stored in the indexed array. In this example, when instructions corresponding to symbol table searcher 156 are executed by a processor (e.g., processor(s) 202 of FIG. 2), this step may be performed. In one example, this step may include performing step 580 described earlier with respect to FIG. 5. Although FIG. 7 shows certain number of steps performed in a certain order, additional or fewer steps in a different order may be performed as part of flow chart 700.

In conclusion, the present disclosure relates to a method, implemented by a processor, for searching an indexed array including a set of hash strings. The method may include receiving a hash string. The method may further include using the processor, determining a first set of index values for the indexed array that correspond to a first stored value matching a first portion of the hash string and determining a second set of index values for the indexed array that correspond to a second stored value matching a second portion of the hash string if a match between the first stored value and the first portion of the hash string is found. The method may further include using the processor, upon finding a match between both the first stored value and the first portion of the hash string and a match between the second stored value and the second portion of the hash string, comparing the hash string to each of the set of hash strings in the indexed array having an index value common to both the first set of index values and the second set of index values.

The determining the first set of index values may comprise looking up a symbol table and determining the second set of index values may comprise looking up the symbol table. The hash string may include comprises an X number of bits, where X is an integer greater than one, and where the first portion of the hash string includes a first set of bits corresponding to left most bits of the X number of bits, the second portion of the hash string includes a second set of bits corresponding to right most bits of the X number of bits.

The indexed array may comprise K number of entries, where K is a positive integer, and the symbol table may also comprise the K number of entries. Each entry of the symbol table may comprise a pair of values including a key value and a corresponding set of index values.

The method may further include inserting a hash string into the indexed array. The inserting the hash string may comprise: (1) extracting: a first set of bits, corresponding to a first key, of the hash string and a second set of bits, corresponding to a second key, of the hash string, (2) obtaining an index value of the hash string from the indexed array, and (3) adding the index value of the hash string to a symbol table.

In another example, the present disclosure relates to a method, implemented by a processor, for searching an indexed array including a set of hash strings. The method may include receiving a hash string comprising X number of bits, where X is an integer greater than one. The method may further include using the processor, extracting a first set of bits from the X number of bits, a second set of bits from the X number of bits, and a third set of bits from the X number of bits. The method may further include using the processor, looking up a symbol table to determine a first set of index values for the indexed array that correspond to a first stored value matching the first set of bits, looking up the symbol table to determine a second set of index values for the indexed array that correspond to a second stored value matching the second set of bits if a match between the first stored value and the first set of bits is found, and looking up the symbol table to determine a third set of index values for the indexed array that correspond to a third stored value matching the third set of bits if a match between the second stored value and the second set of bits is found. The method may further include using the processor, upon finding a match between the first stored value and the first set of bits, a match between the second stored value and the second set of bits, and a match between the third stored value and the third set of bits, comparing the hash string to each of the set of hash strings in the indexed array having an index value common to the first set of index values, the second set of index values, and the third set of index values to determine a match between the hash string and any of the set of hash strings stored in the indexed array.

The first set of bits may correspond to left most bits of the X number of bits, the second set of bits may correspond to middle bits of the X number of bits, and the third set of bits may correspond to right most bits of the X number of bits. The indexed array may include K number of entries, where K is a positive integer, and where the symbol table also comprises the K number of entries. Each entry of the symbol table may comprise a pair of values including a key value and a corresponding set of index values.

The method may include inserting a hash string into the indexed array. The inserting the hash string may comprise: (1) extracting a first set of bits, corresponding to a first key, of the hash string, a second set of bits, corresponding to a second key, of the hash string, and a third set of bits, corresponding to a third key, of the hash string (2) obtaining an index value of the hash string from the indexed array, and (3) adding the index value of the hash string to a symbol table.

In yet another example, the present disclosure relates to a system, including a processor, for searching an indexed array, stored in a memory, including a set of hash strings. The system may be configured to receive a hash string. The system may further be configured to determine a first set of index values for the indexed array that correspond to a first stored value matching a first portion of the hash string and determining a second set of index values for the indexed array that correspond to a second stored value matching a second portion of the hash string if a match between the first stored value and the first portion of the hash string is found. The system may further be configured to upon finding a match between both the first stored value and the first portion of the hash string and a match between the second stored value and the second portion of the hash string, compare the hash string to each of the set of hash strings in the indexed array having an index value common to both the first set of index values and the second set of index values.

The system may comprise a memory configured to store a symbol table and the system is further configured to look up the symbol table to determine the first set of index values and to determine the second set of index values. The hash string may comprise an X number of bits, where X is an integer greater than one, and where the first portion of the hash string includes a first set of bits corresponding to left most bits of the X number of bits, the second portion of the hash string includes a second set of bits corresponding to right most bits of the X number of bits.

The indexed array may comprise K number of entries, where K is a positive integer, and where the symbol table also comprises the K number of entries. Each entry of the symbol table may comprise a pair of values including a key value and a corresponding set of index values.

The system may further be configured to insert a hash string into the indexed array. The system may be configured to insert the hash string by: (1) extracting a first set of bits, corresponding to a first key, of the hash string and a second set of bits, corresponding to a second key, of the hash string, (2) obtaining an index value of the hash string from the indexed array, and (3) adding the index value of the hash string to a symbol table.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with, transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by a processor, for searching an indexed array including a set of hash strings, the method comprising:
    receiving a first hash string;
    determining that a first key matches a first portion of the first hash string, the first key corresponding to a first set of index values for the indexed array;
    determining that a second key matches a second portion of the first hash string, the second key corresponding to a second set of index values for the indexed array; and determining that the first hash string matches a second hash string in the indexed array, the second hash string having an index value common to both the first set of index values and the second set of index values.

2. The method of claim 1, wherein the determining that the first key matches the first portion of the first hash string comprises looking up a symbol table and wherein determining that the second key matches the second portion of the first hash string comprises looking up the symbol table.

3. The method of claim 1, wherein the first hash string comprises X number of bits, wherein X is an integer greater than one, and wherein the first portion of the first hash string includes a first set of bits corresponding to left most bits of the X number of bits, and the second portion of the first hash string includes a second set of bits corresponding to right most bits of the X number of bits.

4. The method of claim 2, wherein the indexed array comprises K number of entries, wherein K is a positive integer, and wherein the symbol table also comprises the K number of entries.

5. The method of claim 4, wherein each entry of the symbol table comprises values including a key value and a corresponding set of index values.

6. The method of claim 1, further comprising inserting a third hash string into the indexed array.

7. The method of claim 6, wherein the inserting the third hash string comprises: (1) extracting a first set of bits, corresponding to a third key of the third hash string and a second set of bits, corresponding to a fourth key of the third hash string, (2) obtaining an index value of the third hash string from the indexed array, and (3) adding the index value of the third hash string to a symbol table.

8. A method, implemented by a processor, for searching an indexed array including a set of hash strings, the method comprising:
receiving a first hash string comprising X number of bits, wherein X is an integer greater than one;
extracting a first set of bits from the X number of bits, a second set of bits from the X number of bits, and a third set of bits from the X number of bits;
determining, by looking up a symbol table, that a first key matches the first set of bits, the first key corresponding to a first set of index values for the indexed array;
determining, by looking up the symbol table, that a second key matches the second set of bits, the second key corresponding to a second set of index values for the indexed array;
determining, by looking up the symbol table, that a third key matches the third set of bits, the third key corresponding to a third set of index values for the indexed array; and
determining that the first hash string matches a second hash string in the indexed array, the second hash string having an index value common to the first set of index values, the second set of index values, and the third set of index values.

9. The method of claim 8, wherein the first set of bits corresponds to left most bits of the X number of bits, the second set of bits corresponds to middle bits of the X number of bits, and the third set of bits corresponds to right most bits of the X number of bits.

10. The method of claim 8, wherein the indexed array comprises K number of entries, wherein K is a positive integer, and wherein the symbol table also comprises the K number of entries.

11. The method of claim 10, wherein each entry of the symbol table comprises values including a key value and a corresponding set of index values.

12. The method of claim 8, further comprising inserting a third hash string into the indexed array.

13. The method of claim 12, wherein the inserting the third hash string comprises: (1) extracting a first set of bits of the third hash string, a second set of bits of the third hash string, and a third set of bits of the third hash string (2) obtaining an index value of the third hash string from the indexed array, and (3) adding the index value of the third hash string to the symbol table.

14. A system, including a processor, for searching an indexed array stored in a memory, the indexed array including a set of hash strings, the system configured to:
receive a first hash string;
determine that a first key matches a first portion of the first hash string, the first key corresponding to a first set of index values for the indexed array;
determine that a second key matches a second portion of the first hash string, the second key corresponding to a second set of index values for the indexed array; and
determine that the first hash string matches a second hash string in the indexed array, the second hash string having an index value common to both the first set of index values and the second set of index values.

15. The system of claim 14, wherein the memory is configured to store a symbol table and the system is further configured to determine that the first key corresponding to the first set of index values matches the first portion of the first hash string by looking up the symbol table and determine that the second key corresponding to the second set of index values matches the second portion of the first hash string by looking up the symbol table.

16. The system of claim 14, wherein the first hash string comprises X number of bits, wherein X is an integer greater than one, and wherein the first portion of the first hash string includes a first set of bits corresponding to left most bits of the X number of bits, and the second portion of the first hash string includes a second set of bits corresponding to right most bits of the X number of bits.

17. The system of claim 15, wherein the indexed array comprises K number of entries, wherein K is a positive integer, and wherein the symbol table also comprises the K number of entries.

18. The system of claim 17, wherein each entry of the symbol table comprises values including a key value and a corresponding set of index values.

19. The system of claim 14, wherein the system is further configured to insert a third hash string into the indexed array.

20. The system of claim 19, wherein the system is configured to insert the third hash string by: (1) extracting a first set of bits of the third hash string and a second set of bits of the third hash string, (2) obtaining an index value of the third hash string from the indexed array, and (3) adding the index value of the third hash string to a symbol table.

* * * * *